(12) United States Patent
Kannan et al.

(10) Patent No.: US 8,819,843 B2
(45) Date of Patent: Aug. 26, 2014

(54) METHODS AND APPARATUS FOR CONDITIONAL ACCESS OF NON REAL-TIME CONTENT IN A DISTRIBUTION SYSTEM

(75) Inventors: Prasanna Kannan, San Diego, CA (US); An Mei Chen, San Diego, CA (US); Thadi M. Nagaraj, San Diego, CA (US); Sajith Balraj, San Diego, CA (US); Jangwon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 12/370,478

(22) Filed: Feb. 12, 2009

(65) Prior Publication Data

US 2009/0210706 A1 Aug. 20, 2009

Related U.S. Application Data

(60) Provisional application No. 61/029,277, filed on Feb. 15, 2008, provisional application No. 61/029,278, filed on Feb. 15, 2008.

(51) Int. Cl.
*G06F 7/04* (2006.01)

(52) U.S. Cl.
USPC .......................................................... 726/27

(58) Field of Classification Search
USPC .......................................................... 726/27
See application file for complete search history.

(56) References Cited

U.S. PATENT DOCUMENTS

| | | | | |
|---|---|---|---|---|
| 6,178,242 | B1 * | 1/2001 | Tsuria | 380/201 |
| 7,228,558 | B1 * | 6/2007 | Lebouill | 725/86 |
| 7,239,704 | B1 * | 7/2007 | Maillard et al. | 380/210 |
| 7,257,227 | B2 * | 8/2007 | Chen et al. | 380/211 |
| 2006/0085828 | A1 * | 4/2006 | Dureau et al. | 725/100 |

(Continued)

FOREIGN PATENT DOCUMENTS

| | | |
|---|---|---|
| CN | 101084674 A | 12/2007 |
| JP | 2007060167 A | 3/2007 |

(Continued)

OTHER PUBLICATIONS

International Preliminary Report on Patentability, PCT/US2009/034010, International Preliminary Examining Authority, European Patent Office, Jun. 22, 2010.

(Continued)

*Primary Examiner* — Teshome Hailu
(74) *Attorney, Agent, or Firm* — Arent Fox LLP

(57) ABSTRACT

Methods and apparatus for conditional access of non real-time (NRT) content in a distribution system. A method includes encrypting NRT content with a control word (CW) to generate encrypted NRT content, providing the CW to entitlement control message (ECM) generators, receiving ECMs from the ECM generators, wherein each ECM comprises a unique encryption of the CW to provide conditional access to the CW, and providing the encrypted NRT content and the ECMs for transmission over a distribution network. An apparatus includes a synchronizer configured to provide a CW to ECM generators and receive ECMs from the ECM generators, wherein each ECM comprises a unique encryption of the CW to provide conditional access to the CW, and a management module configured to encrypt the NRT content with the CW to generate encrypted NRT content and provide the encrypted NRT content and the ECMs for transmission over the distribution network.

41 Claims, 13 Drawing Sheets

(56) References Cited

U.S. PATENT DOCUMENTS

| | | | |
|---|---|---|---|
| 2006/0123246 A1 | 6/2006 | Vantalon | |
| 2006/0159264 A1* | 7/2006 | Chen et al. | 380/231 |
| 2007/0277245 A1* | 11/2007 | Goto et al. | 726/27 |
| 2008/0313402 A1* | 12/2008 | Wong et al. | 711/118 |
| 2009/0187762 A1* | 7/2009 | Okamoto et al. | 713/157 |
| 2009/0190757 A1* | 7/2009 | Chen et al. | 380/242 |
| 2009/0310930 A1* | 12/2009 | Morimoto et al. | 386/52 |

FOREIGN PATENT DOCUMENTS

| | | |
|---|---|---|
| JP | 2007523536 A | 8/2007 |
| WO | 0195613 | 12/2001 |
| WO | 2005079213 A2 | 9/2005 |
| WO | 2006062625 A2 | 6/2006 |
| WO | 2007001285 | 1/2007 |

OTHER PUBLICATIONS

International Search Authority, PCT/US2009/034010, International Searching Authority, European Patent Office, Oct. 2, 2009.

Written Opinion, PCT/US2009/034010, International Searching Authority, European Patent Office, Oct. 2, 2009.

European Search Report for EP Patent Application No. EP09709800 filed on May 21, 2012.

\* cited by examiner

METHODS AND APPARATUS FOR CONDITIONAL ACCESS OF NON REAL-TIME CONTENT IN A DISTRIBUTION SYSTEM

CLAIM OF PRIORITY UNDER 35 U.S.C. §119

The present Application for Patent claims priority to Provisional Application No. 61/029,278 entitled "METHODS AND APPARATUS FOR FORWARD LINK ONLY FRAMEWORK" filed Feb. 15, 2008, and assigned to the assignee hereof and hereby expressly incorporated by reference herein.

The present Application for Patent claims priority to Provisional Application No. 61/029,277 entitled "METHODS AND APPARATUS FOR FORWARD LINK ONLY NON REAL TIME FILE FORMAT" filed Feb. 15, 2008, and assigned to the assignee hereof and hereby expressly incorporated by reference herein

BACKGROUND

Data networks, such as wireless communication networks, have to trade off between services customized for a single terminal and services provided to a large number of terminals. For example, the distribution of non real time (NRT) content to a large number of resource limited portable devices (subscribers) is a complicated problem. Therefore, it is very important for network administrators, content retailers, and service providers to have a way to distribute NRT content and/or other network services in a fast and efficient manner and in such a way as to increase bandwidth utilization and terminal power efficiency.

In current content delivery/distribution systems, foreground and background services are packed into a transmission frame and delivered to devices on a network. For example, a communication network may utilize Orthogonal Frequency Division Multiplexing (OFDM) to broadcast real time services from a network server to one or more mobile devices. For example, the foreground services comprise real time streaming video and/or audio that generally needs to be processed when received. The background services comprise non real-time advertisements, presentations, files or other data.

It has become increasingly important in current wireless distribution systems to be able to provide conditional access (CA) to content. Conditional access means that one or more network entities (such as third party content vendors) are able to control user access to selected content to prevent unauthorized use. For example, conventional systems currently operate to provide conditional access to real time content, such as news, weather, sports, etc. However, conditional access systems to control access to NRT content are not available.

Therefore, it would be desirable to have a system that operates to provide conditional access to NRT content over a distribution network.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a NRT content distribution system (comprising methods and apparatus) is described that operates to provide efficient conditional access of non real-time content transmitted over a distribution network. In an aspect, the system interfaces to one or more third party conditional access systems to allow these systems to control user access to the NRT content.

The system is suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
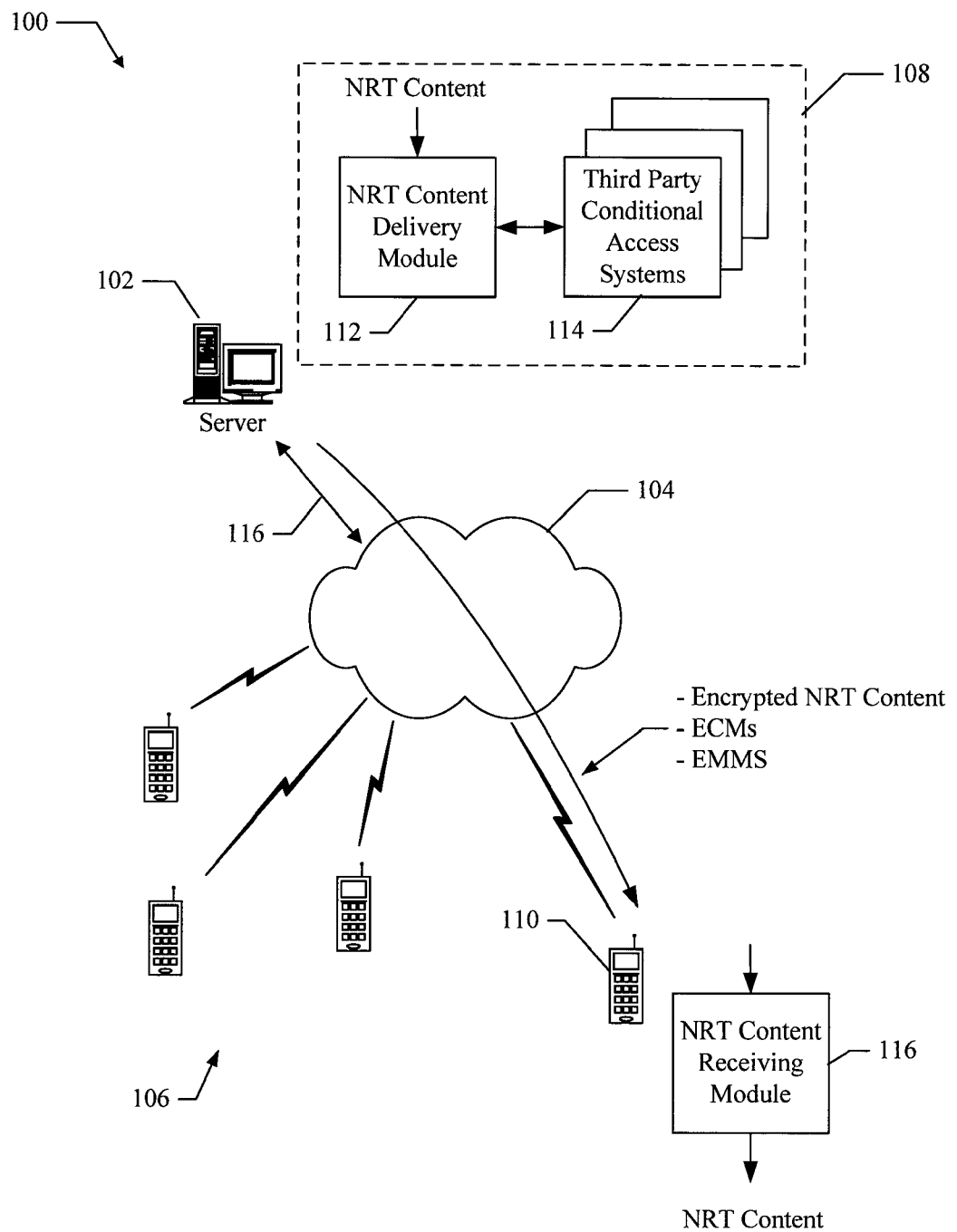
FIG. 1 shows a communication system that illustrates aspects of a NRT content distribution system.

FIG. 1 shows a communication system 100 that illustrates aspects of a NRT content distribution system. The communication system 100 comprises server 102, distribution network 104, and devices 106. In an aspect, the NRT content distribution system operates to allow the server 102 to provide conditional access to NRT content delivered to devices in communication with the distribution network 104. The NRT content comprises media clips, presentations, data, metadata, applications or any other type of non real-time content.

The server 102 operates to communicate with the network 104 using any type of communication link 116. The network 104 may be any type of wired and/or wireless distribution network, such as a forward link only broadcast network. In an aspect, the network 104 provides services to a local area in which the devices 106 are operating. For example, the network 104 may operate to distribute information to a local region or community, city, or county. Although only a few devices 106 are shown, it should be noted that the system is suitable for use with any number and/or types of devices.

The server 102 comprises NRT delivery component 108 that includes a NRT content delivery module 112 that operates to receive NRT content for distribution over the network 104. The NRT content delivery module 112 interfaces to third party conditional access systems 114 to allow access to the NRT content to be controlled by one or more of the third party conditional access systems. For example, the NRT content is encrypted with a control word and each conditional access system 114 operates to encrypt the control word with a long term key associated with the particular conditional access system; thereby generating an entitlement control message (ECM) that comprises the encrypted control word. Each conditional access system also generates an entitlement management message (EMM) that comprises the long term key and is distributed to authorized users (i.e., when each user subscribes to receive the NRT content). Thus, each conditional access system is able to limit access of the NRT content to its subscribers.

In one or more aspects, The NRT delivery component 108 operates to perform one or more of the following operations.
1. Obtain non real-time content to be distributed
2. Obtain a control word to encrypt the NRT content.
3. Encrypt the NRT content using the control word to generated encrypted NRT content.
4. Interface with one or more third party conditional access systems to obtain ECMs and EMMs that allow each conditional access system to control access to the encrypted content.
5. Transmit the encrypted content, ECMs and EMMs over a distribution network.

The transmitted encrypted NRT content, ECMs and EMMs are receivable by the devices 106. For the purpose of this description, the operation of the devices will be described with reference to the device 110.

The device 110 comprises a NRT content receiving module 116. This module operates to receive the encrypted content, ECMs and EMMs. If the device 110 is authorized to access particular NRT content, it may use a received EMM to obtain a long term key with which to decrypt the appropriate ECM associated with that NRT content. The ECM comprises a control word that can be used to decrypt the encrypted NRT content for storage and/or rendering.

Therefore, aspects of the NRT content distribution system operate to provide efficient conditional access of NRT content transmitted over a distribution network. It should be noted that the communication system 100 illustrates just one implementation and that other implementations are possible within the scope of the aspects.

Figure 2:
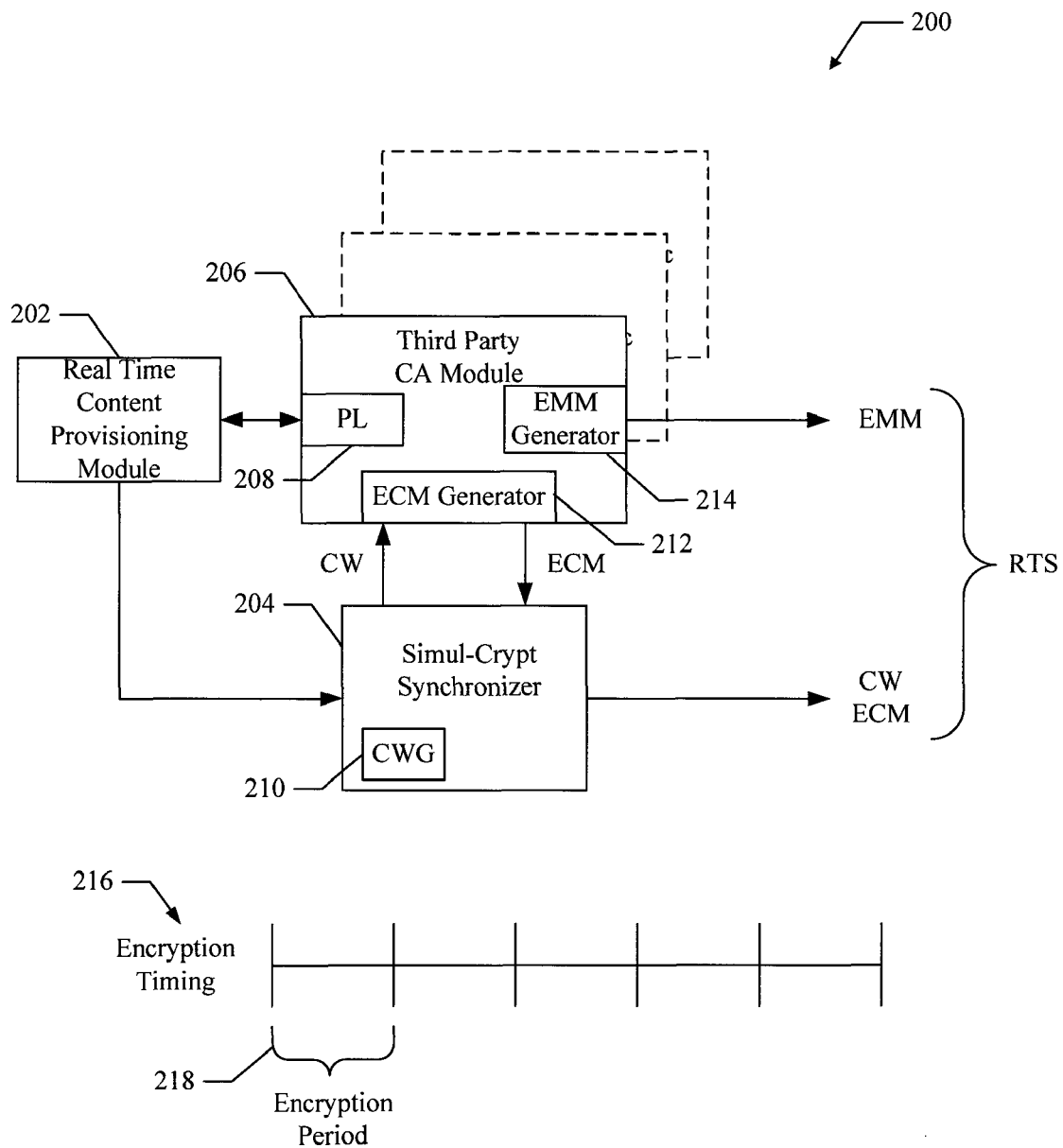
FIG. 2 shows a conventional real-time conditional access content distribution system.

FIG. 2 shows a conventional real-time conditional access content distribution system 200. The system 200 comprises real-time content provisioning module 202, simul-crypt synchronizer (SCS) 204 and one or more third party conditional access modules 206. For example, the system 200 is operable to schedule and deliver real time content over a distribution network.

The real-time content provisioning module 202 operates to communicate with provisioning logic (PL) 208 at the third party modules 206 to provision and schedule the delivery of real time content. Once content provisioning is complete, the real time content provisioning module 202 communicates with the simul-crypt synchronizer 204 to obtain a control word (short term key) for encrypting the real time content. The simul-crypt synchronizer 204 comprises a control word generator (CWG) 210 that operates to generate a control word that is passed to an ECM generator 212 of the third party modules 206. In response, the ECM generator 212 generates an ECM comprising the control word which has been encrypted by a long term key provided by the respective third party module 206. The simul-crypt synchronizer 204 then passes the control word and corresponding ECM(s) to a real time transport system (RTS) for distribution.

In addition, the third party modules 206 comprise an EMM generator 214 that generates an EMM that comprises the long term key which can be used to decrypt a corresponding ECM to obtain the control word. The EMM(s) are also passed to the RTS for distribution.

During operation, the RTS operates to encrypt the real time content with the control word and transmit the encrypted content and ECM over a particular flow or channel of the distribution network. The EMM is transmitted over the distribution network on a different flow or channel.

To prevent unauthorized access, the control word is periodically changed by the simul-crypt synchronizer 204. For example, the control word may be changed every ten seconds so that if the current control word is comprised, only ten seconds of content can be accessed by unauthorized users.

The time line 216 illustrates how the control word is periodically changed by the simul-crypt synchronizer 204. An encryption period 218 is used to determine how often to change the control word so as to limit content access by unauthorized users. At the end of each encryption period 218, the simul-crypt synchronizer 204 controls the CWG 210 to generate a new control word that is passed to the third party conditional access modules 206. New ECMs and EMMs are generated and passed to the real time transport system.

Figure 3:
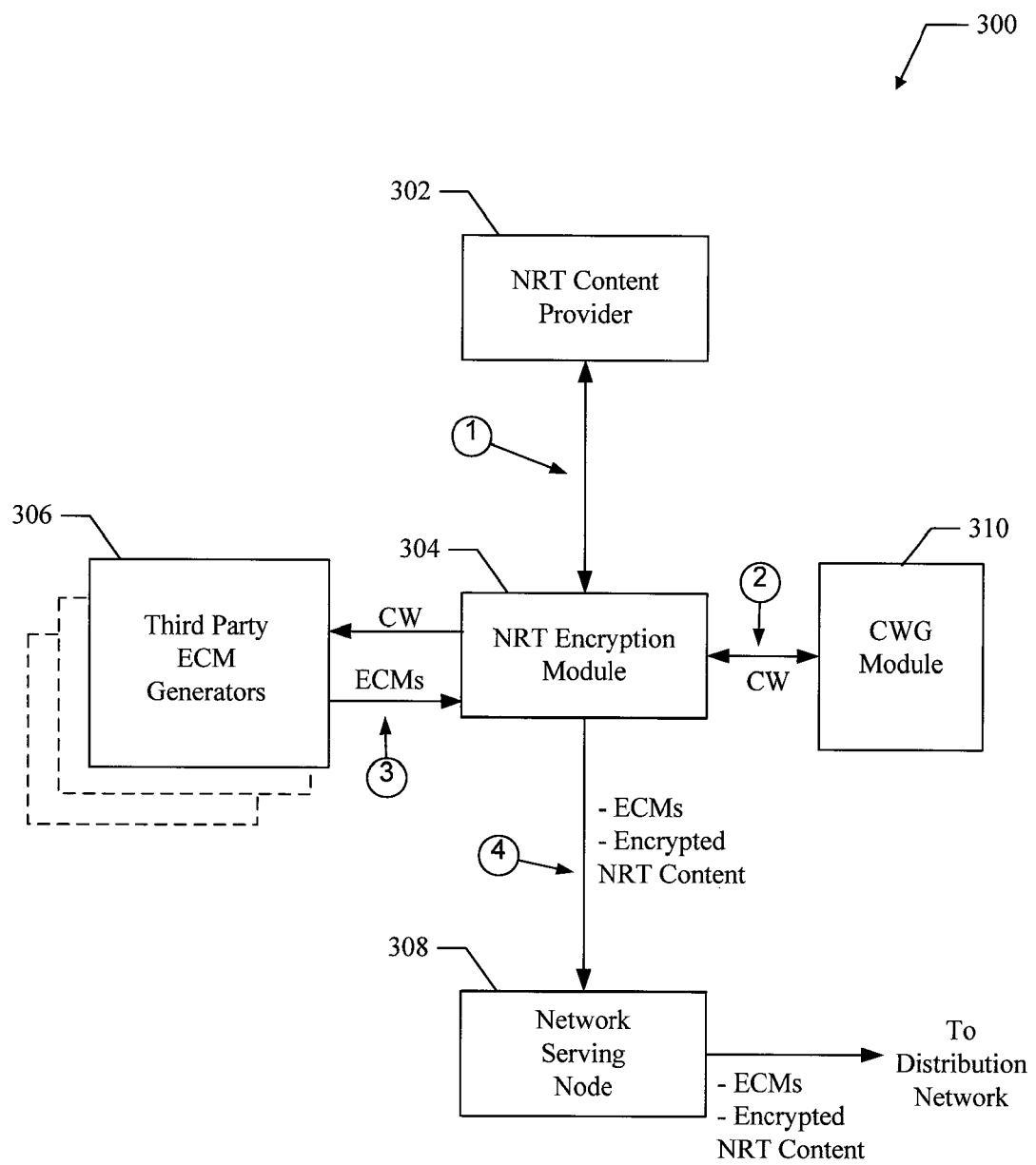
FIG. 3 shows an exemplary NRT content distribution system.

FIG. 3 shows an exemplary NRT content distribution system 300. For example, the system 300 is suitable for use as the NRT content delivery component 108 shown in FIG. 1.

The system 300 comprises NRT content provider 302, NRT encryption module 304, one or more third party ECM generators 306, network serving node 308, and CWG module 310. FIG. 3 also shows interfaces that exist between the various components of the NRT content distribution system 300. Each of the interfaces is identified by a circled numeral.

The NRT content provider 302 operates to provide NRT content to the NRT encryption module 304 using interface 1. Interface 1 is a content acquisition interface and allows the NRT encryption module 304 to acquire NRT content for distribution over a distribution network.

The NRT encryption module 304 operates to communicate with the CWG module 310 using interface 2. The CWG module 310 operates to generate a control word that is to be used to encrypt the NRT content. The interface 2 is control word acquisition interface that allows the NRT encryption module 304 to acquire the generated control word.

The NRT encryption module 304 operates to communicate with the third party ECM generators 306 using interface 3. The third party ECM generators 302 operate to receive the control word from the NRT encryption module 304 and encrypt the control word with a long term key to generate ECMs, respectively, which comprises the encrypted control word. The interface 3 is an encryption to ECM generator interface that allow the NRT encryption module 304 acquire ECMs associated with one or more third party vendors.

The encryption module 304 also operates to encrypt the NRT content with the control word to generate encrypted NRT content. The encrypted NRT content and associated ECMs are passed to the network serving node 308 using interface 4. The network serving node 308 provides access to a distribution network so that the NRT encrypted content can be distributed to devices in communication with the distribution network. The interface 4 is an encrypted content delivery interface that allows the encryption module 304 to deliver the encrypted NRT content and the ECMs to the network serving node 308.

Thus, during operation, the NRT content distribution system 300 operates to provide one or more of the following functions.
1. Acquire NRT content for distribution over a distribution network.
2. Acquire a control word to be used to encrypt the content.
3. Encrypt the NRT content with the control word.
4. Acquire ECMs associated with one or more third party ECM generators.
5. Deliver the encrypted NRT content and the ECMs to a network serving node for distribution over a distribution network.

Figure 4:
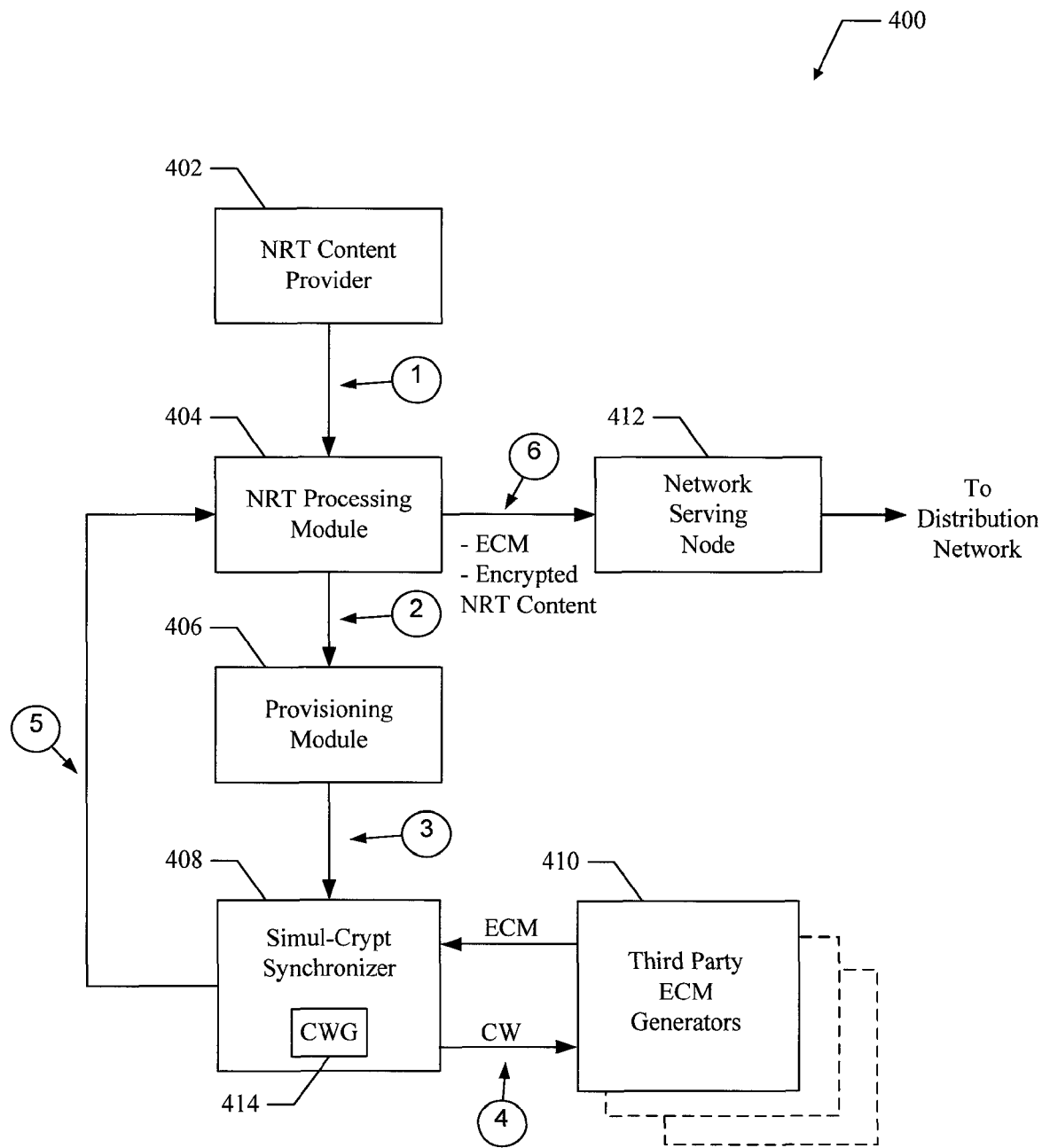
FIG. 4 shows another exemplary NRT content distribution system.

FIG. 4 shows another exemplary NRT content distribution system 400. For example, the system 400 is suitable for use as the NRT content delivery component 108 shown in FIG. 1.

The system 400 comprises NRT content provider 402, NRT processing module 404, provisioning module 406, simul-crypt synchronizer 408, one or more third party ECM generators 410, and network serving node 412. FIG. 4 also shows interfaces that exist between the various components of the NRT content distribution system 400. Each of the interfaces is identified by a circled numeral.

The NRT content provider 402 operates to provide NRT content to the NRT processing module 404 using interface 1. Interface 1 is a content acquisition interface and allows the NRT processing module 404 to acquire NRT content for distribution over a distribution network.

The NRT processing module 404 operates to communicate with the provisioning module 406 using interface 2. The provisioning module 406 operates to provision and schedule the distribution of the NRT content over a distribution network. The interface 2 is a NRT content notification interface that indicates to the provisioning module 406 that NRT content is available for distribution over the distribution network.

The provisioning module 406 operates to communicate with the simul-crypt synchronizer 408 using interface 3. The interface 3 comprises a provisioning to encryption interface that allows the provisioning module 406 to provide provisioning, scheduling, and various access criteria to the simul-crypt synchronizer 408. For example, the access criteria identify the NRT content and provide information about the availability of the NRT content on the distribution network.

The simul-crypt synchronizer 408 operates to receive the access criteria from the provisioning module 406 and control a control word generator 414 to generate a control word with which to encrypt the NRT content. The simul-crypt synchronizer 408 then passes the generated control word to the third party ECM generators 410 using interface 4. The interface 4 comprises an SCS to ECM generator interface that allows control words to be passed to the ECM generators 410 and generated ECM(s) to be returned to the SCS 408. The SCS 408 then passes the control word and ECMs to the NRT processing module 404.

The third party ECM generators 410 operate to receive control words and encrypt the control words into ECMs. Each ECM generator may encrypt the control word using a different long term key. Thus, the ECM generators can control access to the NRT content so that only users that have access to the appropriate long term key can decrypt the control word.

The SCS 408 also operates to pass the control word and the ECMs to the NRT processing module 404 using interface 5. The interface 5 comprises a control word and ECM delivery interface that allows the NRT processing module 404 to obtain the control word and ECMs. The NRT processing module 404 then operates to encrypt the NRT content with the control word to generate encrypted NRT content. The encrypted NRT content and associated ECMs are passed to the serving node 412 using interface 6 which comprises an encrypted content delivery interface.

The serving node 408 provides access to a distribution network so that the encrypted NRT content and the ECMs can be distributed to devices in communication with the distribution network.

Thus, during operation the NRT content distribution system 400 operates to provide one or more of the following functions.
1. Acquire NRT content for distribution over a distribution network.
2. Perform provisioning and scheduling related to the NRT content to determine access criteria.
3. Cause a control word to be generated to be used to encrypt the NRT content.
4. Encrypt the control word with a long term key based on the access criteria to generate ECMs.
5. Encrypt the NRT content with the control word to generate encrypted NRT content.
6. Deliver the encrypted NRT content and the ECMs to a network serving node for distribution over a distribution network.

Figure 5:
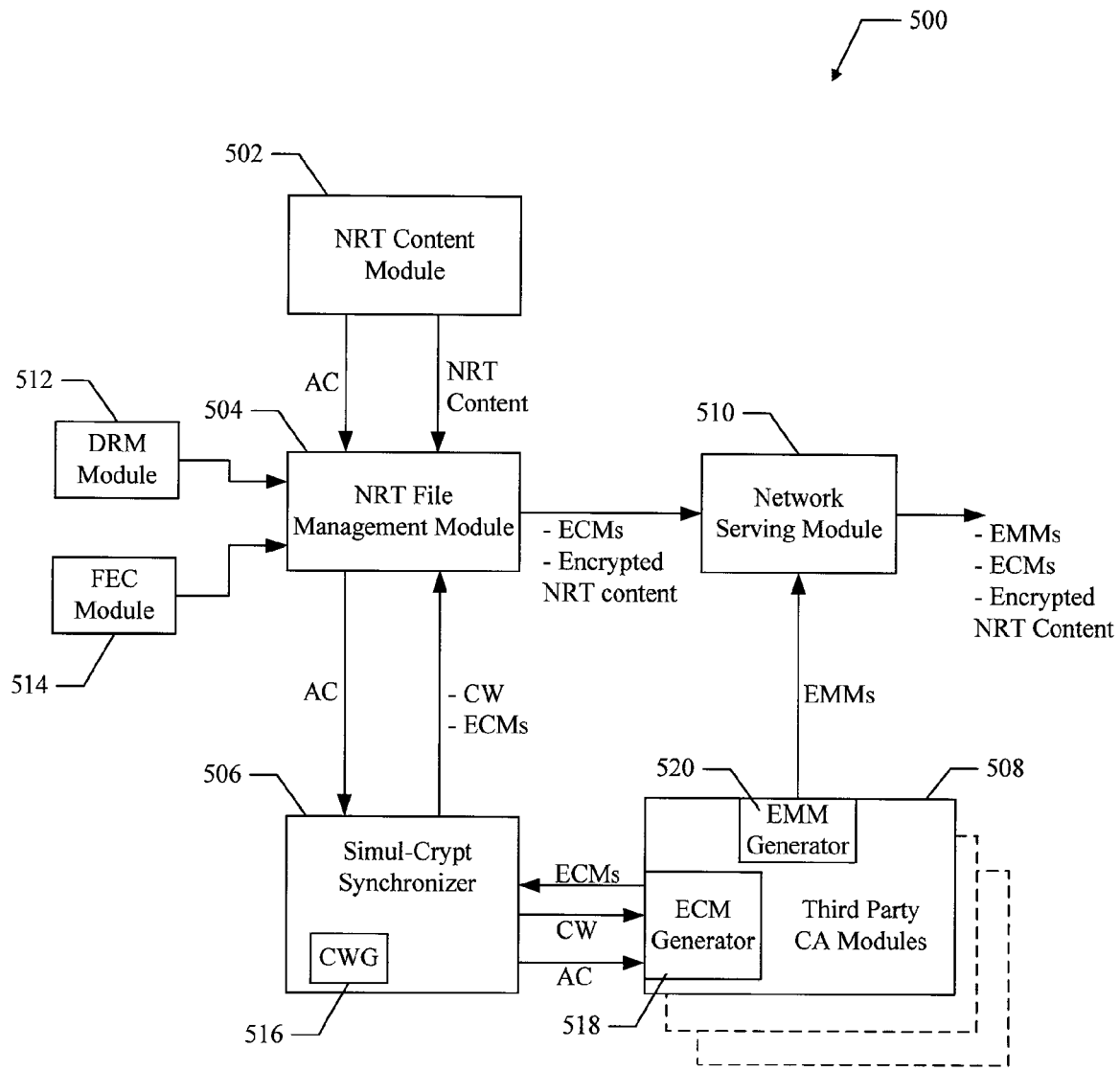
FIG. 5 shows still another exemplary NRT content distribution system.

FIG. 5 shows another exemplary NRT content distribution system 500. For example, the system 500 is suitable for use as the NRT content delivery component 108 shown in FIG. 1.

The system 500 comprises a NRT content module 502, a NRT file management module 504, a SCS 506, one or more third party CA modules 508, and a network serving module 510. It should be noted that the system 500 illustrates just one implementation and that other implementations are possible within the scope of the various aspects.

The NRT content module 502 comprises hardware and/or hardware executing software that operate to obtain the non real time content and provide this content to the NRT file management module 504. The NRT content module 206 also provides access control (AC) parameters (or access criteria) to the NRT file management module 504. The access control parameters are associated with the NRT content and are utilized by the third party CA modules 508 to control access to the NRT content as will be discussed below. In an aspect, the AC parameters are used by the CA providers and consumed by ECM generators to generate ECMs. In one example, the AC parameters identifiers NRT content or may be associated with rights of the NRT content.

The NRT file management module 504 comprises hardware and/or hardware executing software that operate to obtain the NRT content and the AC parameters. The NRT file management module 504 passes the AC parameters to the SCS 506.

The SCS 506 comprises hardware and/or hardware executing software that operate to generate a control word that is used to encrypt the NRT content. For example, the SCS 506 comprises a control word generator 516 that operates to generation control word. The SCS 506 passes generated control words and the received AC parameters to the third party CA modules 508. An ECM generator 518 at each third party CA module 508 receives the control word and AC parameters and generates an ECM message. The ECM message from each of the modules 508 is returned to the SCS 506. The SCS 506 operates to pass the control word and the received ECM messages to the NRT file management module 504.

Each of the third party CA modules 508 further comprises an EMM generator 520. The EMM generator 520 generates an EMM that comprises a long term key that can be used to decrypt the associated ECM message. The generated EMM messages are passed to the network serving module 510 for delivery over a distribution network. For example, the EMM messages may be delivered over the distribution network in an IP datacast. In an aspect, a grouping operation is performed where one EMM is used to cover many users to reduce bandwidth requirements.

The NRT file management module 504 operates to encrypt the NRT content with the generated control word. The encrypted NRT content and the generated ECM messages are output to the network serving module 510. In an aspect, the NRT file management module 504 operates to receive information from digital rights management (DRM) module 512. This information is used by the NRT file management module 504 to associate digital rights management with the encrypted NRT content. For example, the DRM module 512 provides fine granularity control to determine how many times a presentation can be viewed.

Additionally, the NRT file management module 504 operates to receive information from a forward error correction module 514. This information is used by the NRT file management module 504 to provide forward error correction for the NRT content. The FEC is used to adjust system performance.

The network serving module 510 comprises at least one of a CPU, processor, gate array, hardware logic, memory elements, virtual machine, and/or hardware executing software. The network serving module 510 operates to output the encrypted NRT content, the generated ECMs and the generated EMMs.

During operation, the system provides conditional access of NRT content by encrypting the NRT content with a selected control word and encrypting the control word using one or more long term keys that are associated with one or more conditional access vendors. In addition, AC parameters are associated with the NRT content to allow the conditional access vendors to further control access to the NRT content. A file management module operates to encrypt the NRT content with the generated control word. The encrypted NRT content, ECMs and EMMs are then distributed over a distribution network.

Therefore, the NRT content distribution system 500 operates in various aspects to perform one or more of the following functions.
1. Acquire NRT content for distribution over a distribution network.
2. Cause a control word to be generated with which to encrypt the NRT content.
3. Encrypt the control word with a long term key based on access criteria to generate one or more ECMs.
4. Generate EMMs comprising the long terms keys associated with each conditional access system
5. Encrypt the NRT content with the control word to generate encrypted NRT content.
6. Deliver the encrypted NRT content, ECMs and EMMs to a network serving node for distribution over a distribution network.

In an aspect, the NRT content distribution system comprises one or more program instructions ("instructions") or sets of codes ("codes") stored or embodied on a machine-readable medium. The codes when executed by at least one processor, for instance, a processor at the NRT file management module 504, provide the functions described herein. For example, the codes may be loaded into the NRT file management module 504 from a machine-readable medium, such as a floppy disk, CDROM, memory card, FLASH memory device, RAM, ROM, or any other type of memory device or machine-readable medium that interfaces to the NRT file management module 504. In another aspect, the codes may be downloaded into the NRT file management module 504 from an external device or network resource. The codes, when executed, provide aspects of a NRT content distribution system as described herein.

Figure 6:
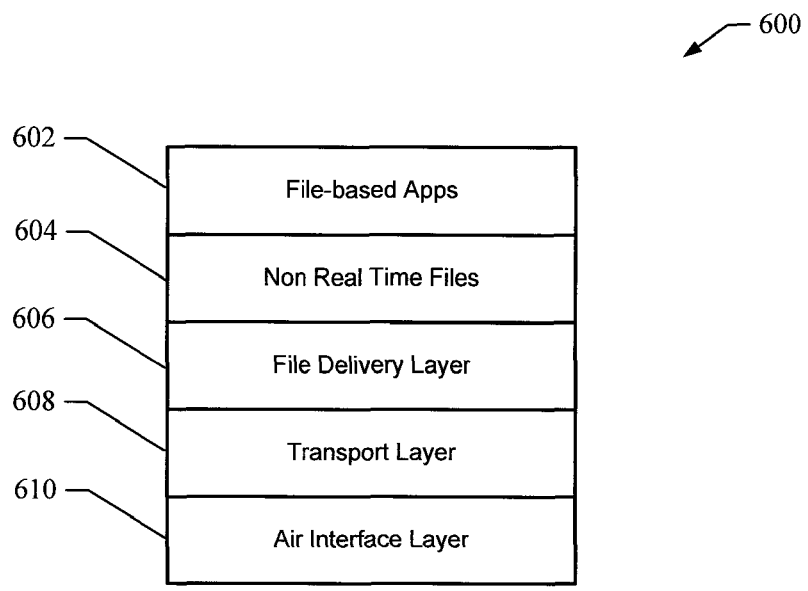
FIG. 6 shows an exemplary protocol stack for use in aspects of a NRT content distribution system.

FIG. 6 shows an exemplary protocol stack 600 for use in aspects of a NRT content distribution system. For example, the protocol stack 600 may be implemented by the NRT file management module 504.

The protocol stack 600 comprises file-based applications 602, non real-time services 604, file delivery layer 606, transport layer 608 and air interface layer 610.

The file delivery layer 606 operates to deliver NRT files to devices. The file delivery layer 606 uses the services of the transport layer 608. Files are subject to message coding to ensure they are delivered efficiently and reliably from the network to devices. A more detailed description of the protocols and messages that belong to the file delivery layer 606 is provided below.

Non Real Time File Format

In various aspects, the NRT content distribution system operates to provide multicast file delivery for later consumption by devices. In one implementation, the file delivery layer 606 operates to provide a NRT file transport mechanism. This mechanism can be used to transport files of any format.

The NRT file transport mechanism operates to provide the following functions.
1. Encapsulates one or more presentations.
2. Leverages network System Information (SI) structures thereby enabling rich feature support.
3. Metadata is XML based for extensibility.
4. Support for Conditional Access.

Figure 7:
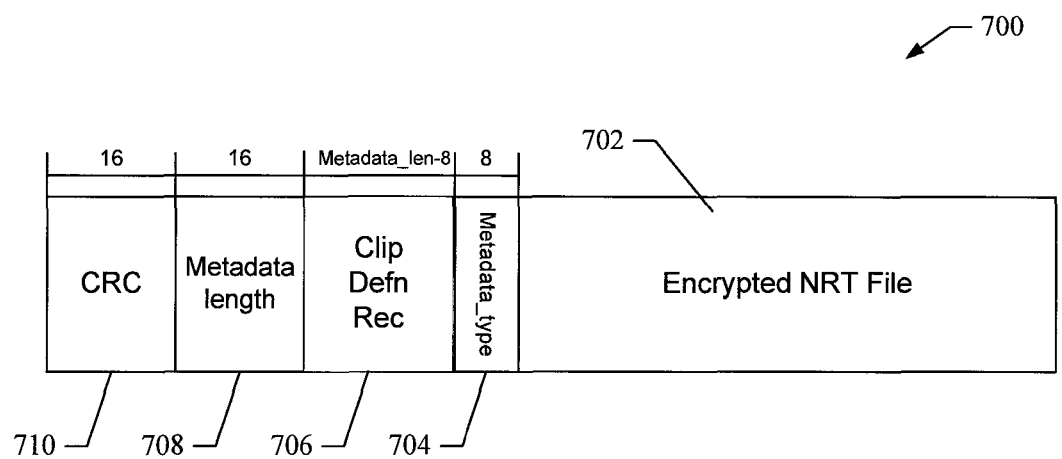
FIG. 7 illustrates a general NRT file format for use in aspects of a NRT content distribution system.

FIG. 7 illustrates a general NRT file format 700 for use in aspects of the NRT content distribution system. Components of the NRT file format 700 are further defined in Table 1 below.

TABLE 1

| Field Name | Field Type |
|---|---|
| NRT_FILE_DATA | Variable |
| META_DATA_TYPE | UINT(8) |
| META_DATA_VALUE | Variable |
| TOTAL_META_DATA_LENGTH | UINT(16) |
| CRC | UINT(16) |

NRT_FILE_DATA (702)

Non real time file data (NRT_FILE_DATA)—Contains an encapsulated file.

META_DATA_TYPE (704)

A meta data type (META_DATA_TYPE)—Identifies the type of meta data where a value of "1" indicates "clip definition record" XML meta data.

META_DATA_VALUE (706)

A meta data value (META_DATA_VALUE)—Contains the meta data, which in this example comprises a clip definition record as further discussed below.

TOTAL_META_DATA_LENGTH (708)

A total meta data length (TOTAL_META_DATA_LENGTH)—Contains the total length of the TYPE and VALUE fields.

CRC (710)

The CRC is a 16-bit CRC calculated over the entire NRT_FILE including the data and meta-data parts except the CRC field. In an aspect, the CRC is calculated using a standard CRC-16-CCITT generator polynomial.

Figure 8:
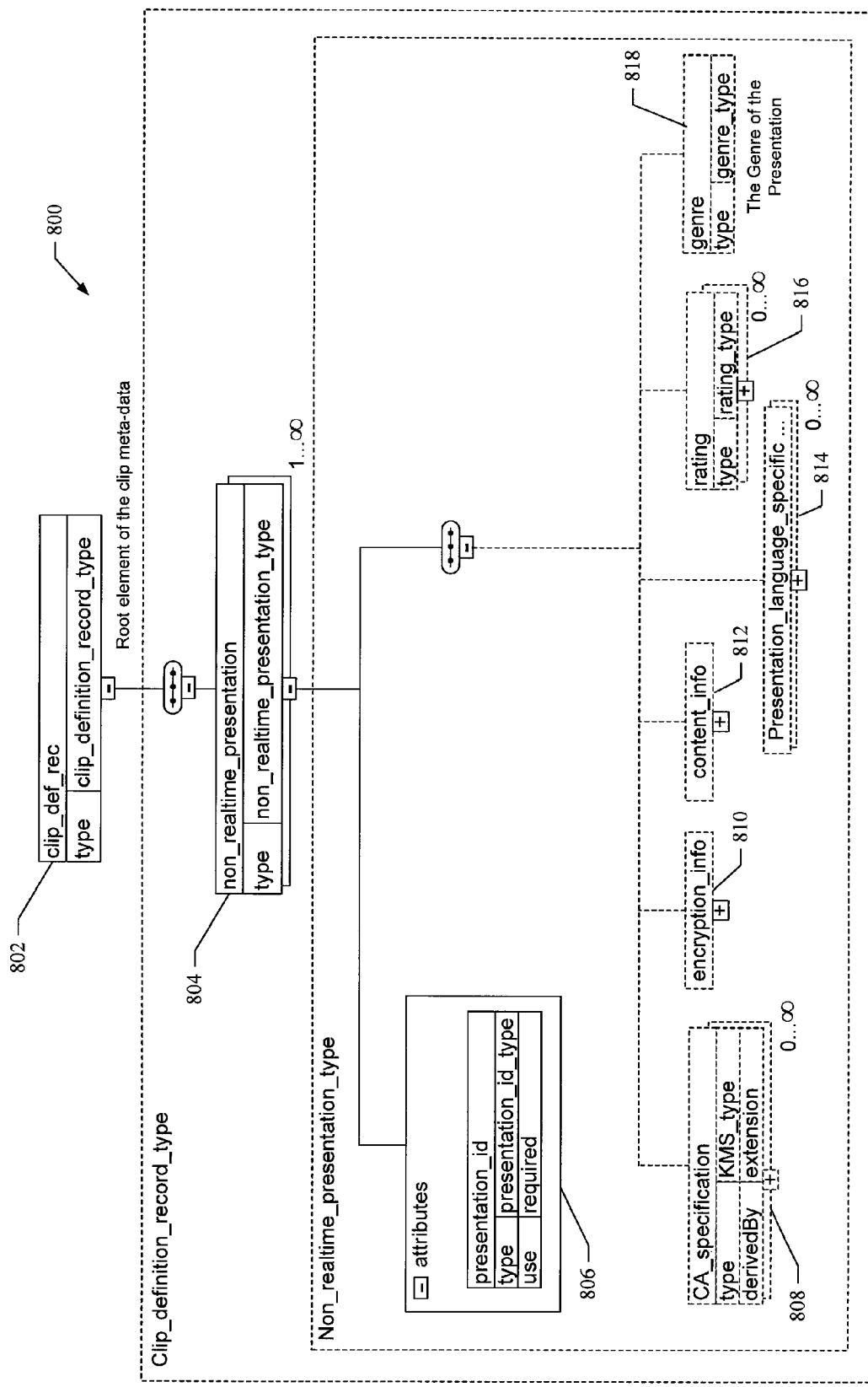
FIG. 8 shows an exemplary clip definition record for use in aspects of a NRT content distribution system.

FIG. 8 illustrates an exemplary clip definition record 800 for use in aspects of a NRT content distribution system. For example, the clip definition record 800 is suitable for use as the meta data value 706 described above.

The clip definition record 800 comprises a record type indicator 802, a NRT presentation indicator 804, attributes 806, conditional access specifications 808, encryption information 810, content information 812, presentation language information 814, rating indicator 816 and genre indicator 818.

Figure 9A:
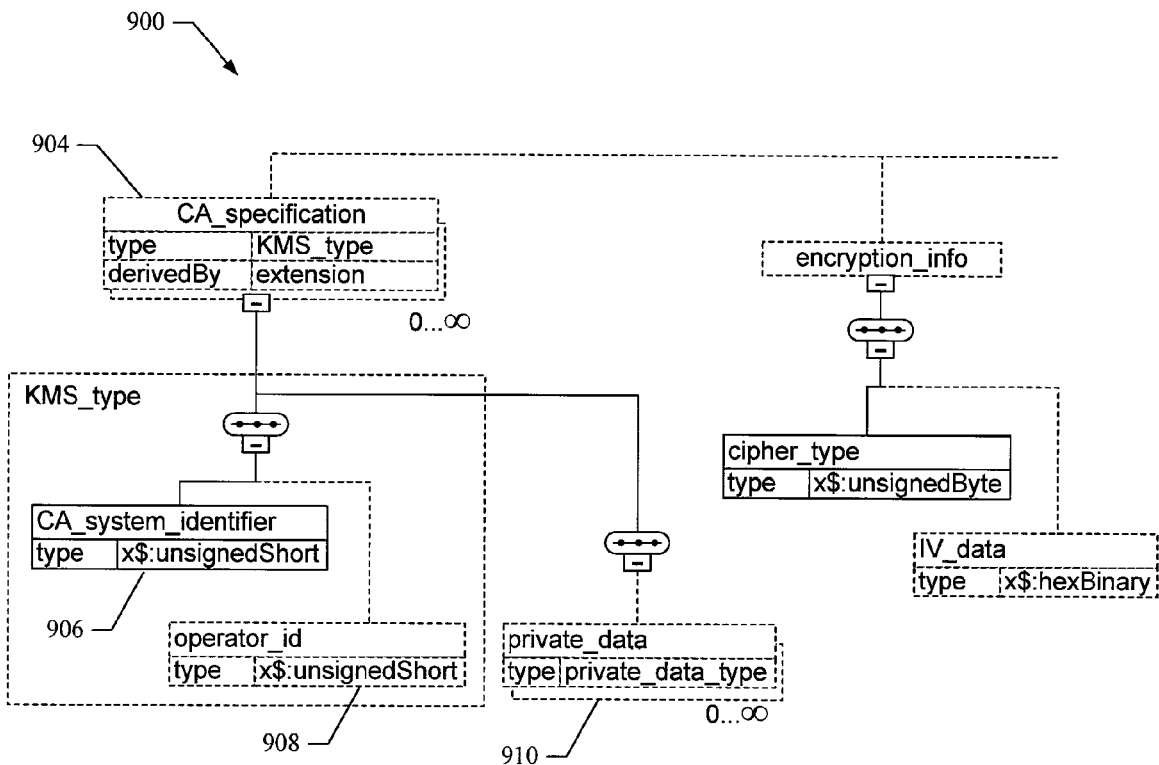
FIGS. 9A-B show an exemplary conditional access parameters and content information parameters that are part of the clip definition record of FIG. 8 for use in aspects of a NRT content distribution system.
Figure 9B:
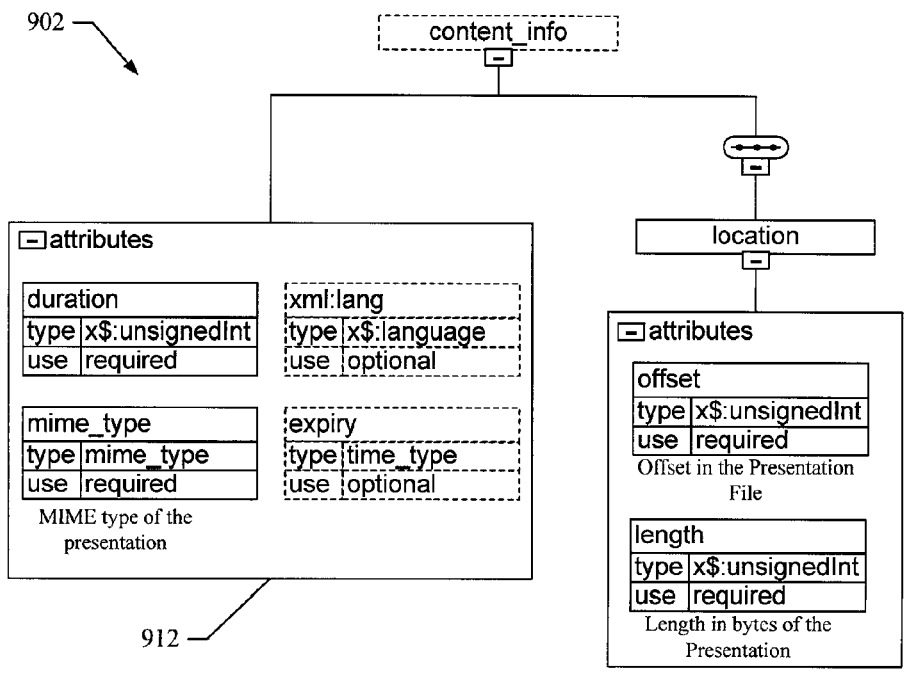

FIGS. 9A-B show an exemplary conditional access parameters 900 and content information parameters 902 that are part of the clip definition record of FIG. 8 for use in aspects of a NRT content distribution system.

The conditional access parameters 900 comprise a conditional access specification indicator 904 that identifies one or more conditional access specifications, a conditional access system identifier 906 that identifies one or more CA venders or third parties, an operator identifier 908, and private data 910 that contains EMCs associated with each identified CA system identifier 906. The content information parameters 902 comprise attributers 912.

Figure 10:
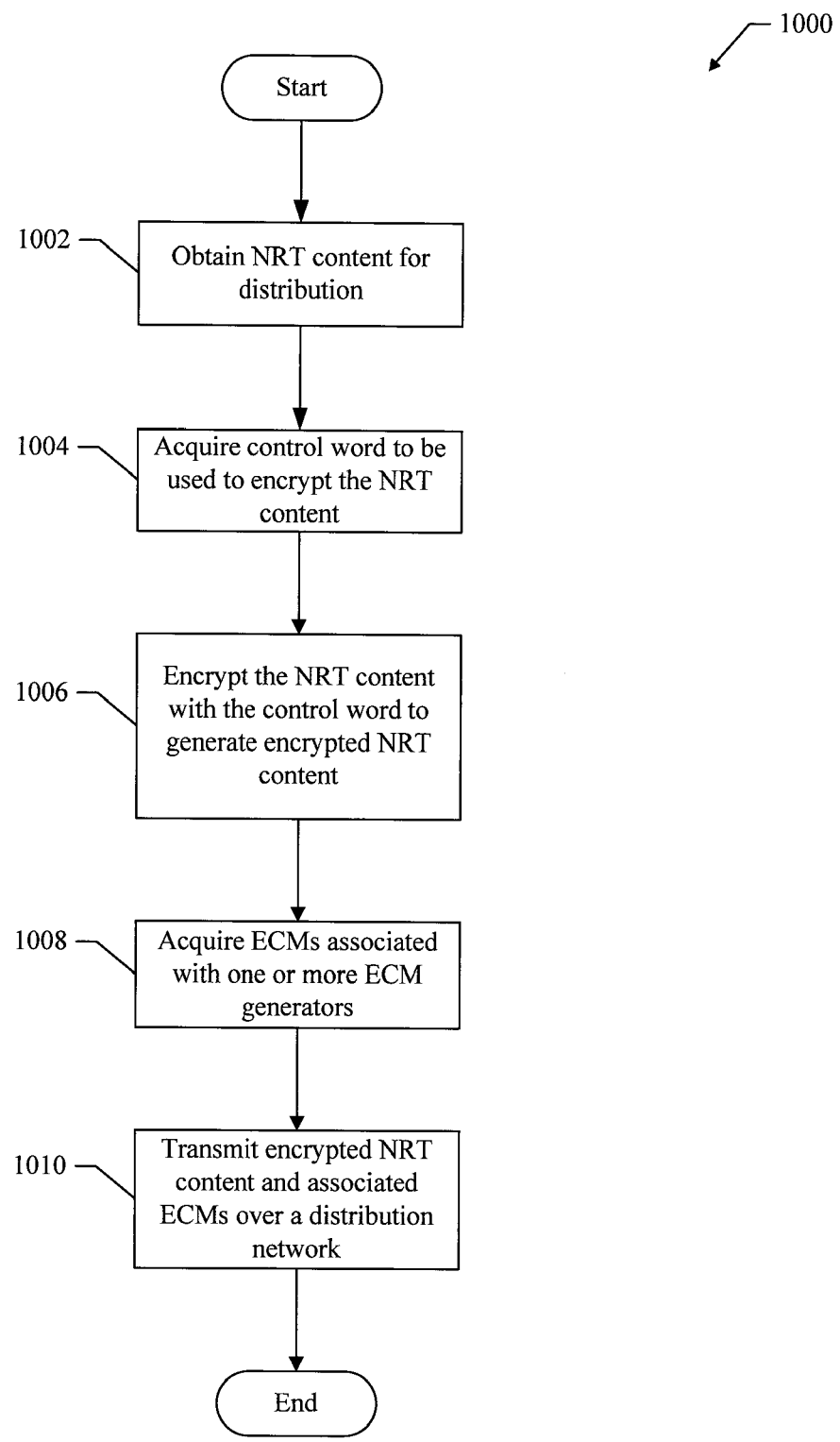
FIG. 10 shows an exemplary method for providing conditional access of NRT content for use in aspects of a NRT content distribution system.

FIG. 10 shows an exemplary method 1000 for use in aspects of a NRT content distribution system. For clarity, the method 1000 is described herein with reference to the NRT content distribution system 300 shown in FIG. 3. For example, in an aspect, the NRT encryption module 304 executes one or more sets of codes to control the NRT content distribution system 300 to perform the operations described below.

At block 1002, NRT content is acquired for distribution to devices on a distribution network. For example, the NRT content may comprise clips, presentations, data or other type of NRT content. In an aspect, the NRT content is acquired by the NRT encryption module 304.

At block 1004, a control word is acquired to be used to encrypt the NRT content. In an aspect, the NRT encryption module 304 acquires the control word from the CWG module 310.

At block 1006, the NRT content is encrypted with the control word to generate encrypted NRT content. In an aspect, the encryption module 304 operates to encrypt the NRT content using the control word.

At block 1008, ECMs associated with one or more ECM generator are acquired. In an aspect, the NRT encryption module 304 passes the control word to the ECM generators 306 and each generator generates an ECM in response.

At block 1010, the encrypted NRT content and the ECMs are delivered to devices over a distribution network. In an aspect, the network serving node 308 operates to transmit the encrypted NRT content and ECMs over the distribution network.

Thus, the method 1000 operates to provide an aspect of a NRT content distribution system. It should be noted that the method 1000 represents just one implementation and that other implementations are possible within the scope of the aspects.

Figure 11:
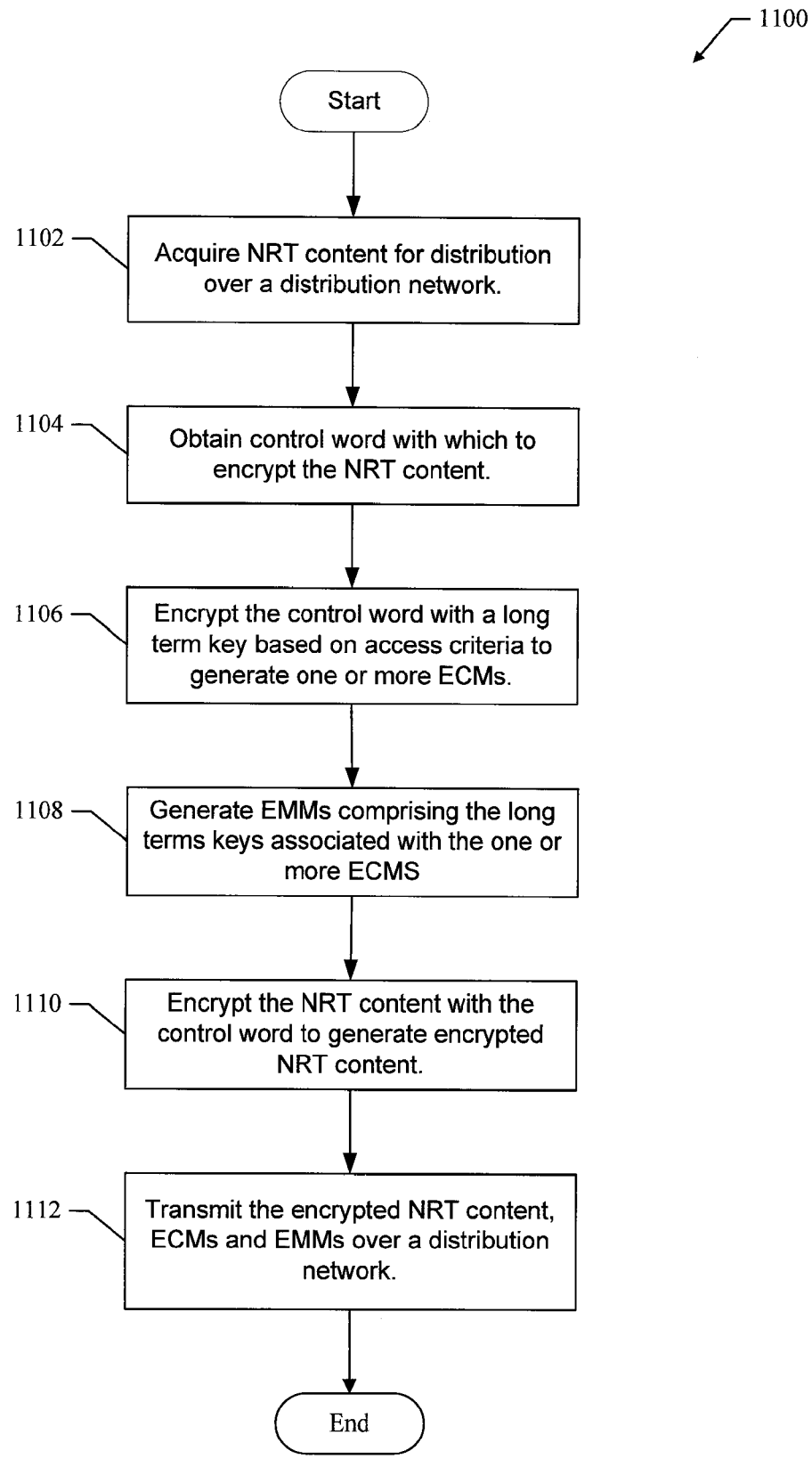
FIG. 11 shows another exemplary method for providing conditional access of NRT content for use in aspects of a NRT content distribution system.

FIG. 11 shows an exemplary method 1100 for use in aspects of a NRT content distribution system. For clarity, the method 1100 is described herein with reference to the NRT content distribution system 500 shown in FIG. 5. For example, in an aspect, the NRT file management module 504 executes one or more sets of codes to control the NRT content distribution system 500 to perform the operations described below.

At block 1102, NRT content is acquired for distribution to devices on a distribution network. For example, the NRT content may comprise clips, presentations, data or other type of NRT content. In an aspect, the NRT content is acquired by the NRT file management module 504.

At block 1104, a control word is acquired to be used to encrypt the NRT content. In an aspect, the NRT file management module 504 acquires the control word from the SCS 506.

At block 1106, one or more ECMs are generated. In an aspect, each ECM generator 518 encrypts the control word using a long term key to generate the ECMs.

At block 1108, one or more EMMs are generated. In an aspect, each EMM generator 520 generates an EMM that comprises the long term key.

At block 1110, the NRT content is encrypted with the control word to generate encrypted NRT content. In an aspect, the NRT file management module 504 operates to encrypt the NRT content using the control word.

At block 1112, the encrypted NRT content, ECMs and EMMs are delivered to devices over a distribution network. In an aspect, the NRT file management module 504 delivers the encrypted NRT content and the ECMs to a network serving node 510 that operates to transmit the encrypted NRT content and ECMs over the distribution network. Furthermore, the EMM generators 520 operate to deliver the EMMs to the network serving node 510 for transmission over the distribution network in an IP datacast.

Thus, the method 1100 operates to provide an aspect of a NRT content distribution system. It should be noted that the method 1100 represents just one implementation and that other implementations are possible within the scope of the aspects.

Figure 12:
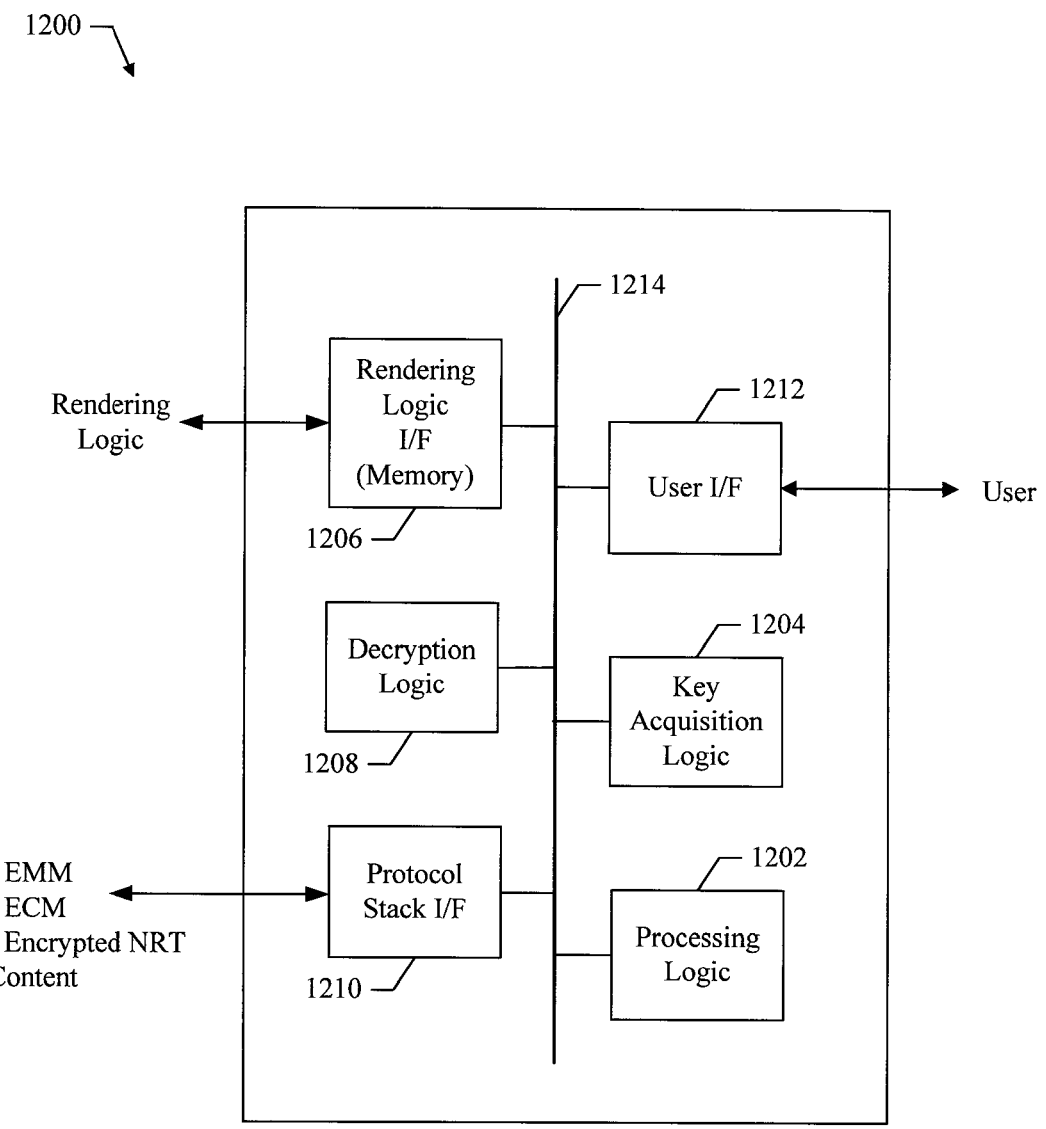
FIG. 12 shows exemplary NRT content receiving module for use in aspects of a NRT content distribution system.

FIG. 12 shows an exemplary NRT content receiving module 1200 for use in aspects of a NRT content distribution system. For example, the NRT content receiving module 1200 is suitable for use as the NRT content receiving module 116 shown in FIG. 1. The NRT content receiving module 1200 comprises processing logic 1202, key acquisition logic 1204, rendering logic interface (I/F) 1206, decryption logic 1208, protocol stack interface 1210, and user interface 1212 all coupled to a data bus 1214.

In an aspect, the processing logic 1202 comprises at least one of a CPU, processor, gate array, hardware logic, memory elements, virtual machine, software, and/or hardware executing software. Thus, the processing logic 1202 generally comprises logic configured to execute machine-readable instructions and to control one or more other functional elements of the NRT content receiving module 1200 using the data bus 1214.

The user interface 1212 comprises hardware and/or hardware executing software that operate to allow the NRT content receiving module 1200 to interact with a device user to receive user instructions. For example, the user may request that particular NRT content be acquired for rendering. In an aspect, the user interface 1212 is controlled by the processing logic 1202.

The rendering logic 1206 comprises hardware and/or hardware executing software that operate to allow the NRT content receiving module 1200 to render received NRT content on a device. For example, the rendering logic 1206 may communicate with a visual display or other device to allow a user to view selected NRT content. In an aspect, the rendering logic 1206 also comprises a memory that can be used to store NRT content for later presentation.

The protocol stack interface 1210 comprises hardware and/or hardware executing software that operate to allow the NRT content receiving module 1200 to obtain encrypted NRT content, ECMs and EMMs from a device protocol stack. In an aspect, the processing logic 1202 operates to control the protocol stack interface 1210 to obtain information from the protocol stack.

The key acquisition logic 1204 comprises hardware and/or hardware executing software that operate to allow the NRT content receiving module 1200 to process EMMs and ECMs to obtain a control word that can be used to decrypt encrypted NRT content. For example, the key acquisition logic 1204 processes EMMs to obtain a long term key that was used to encrypt a particular ECM. The long term key is then used to decrypt the ECM to obtain the control word. The control word is then passed to the decryption logic 1208.

The decryption logic 1208 comprises hardware and/or hardware executing software that operate to allow the NRT content receiving module 1200 to decrypt encrypted NRT content. For example, the protocol stack interface 1210 operates to acquire encrypted NRT content from a device protocol stack. The encrypted content is passed to the decryption logic 1208 where a control word is used to decrypt the NRT content. The NRT content is then passed to the rendering logic 1206 where is it processed for rendering on a device or stored in a memory for later processing.

In an aspect, the NRT content distribution system comprises one or more program instructions ("instructions") or sets of codes ("codes") stored or embodied on a machine-readable medium. The codes when executed by at least one processor, for instance, a processor at the processing logic 1202, provides the functions described herein. For example, the codes may be loaded into the processing logic 1202 from a machine-readable medium, such as a floppy disk, CDROM, memory card, FLASH memory device, RAM, ROM, or any other type of memory device or machine-readable medium that interfaces to the file receiver 1200. In another aspect, the codes may be downloaded into the file receiver 1200 from an external device or network resource. The codes, when executed, provide aspects of the NRT content distribution system as described herein.

Figure 13:
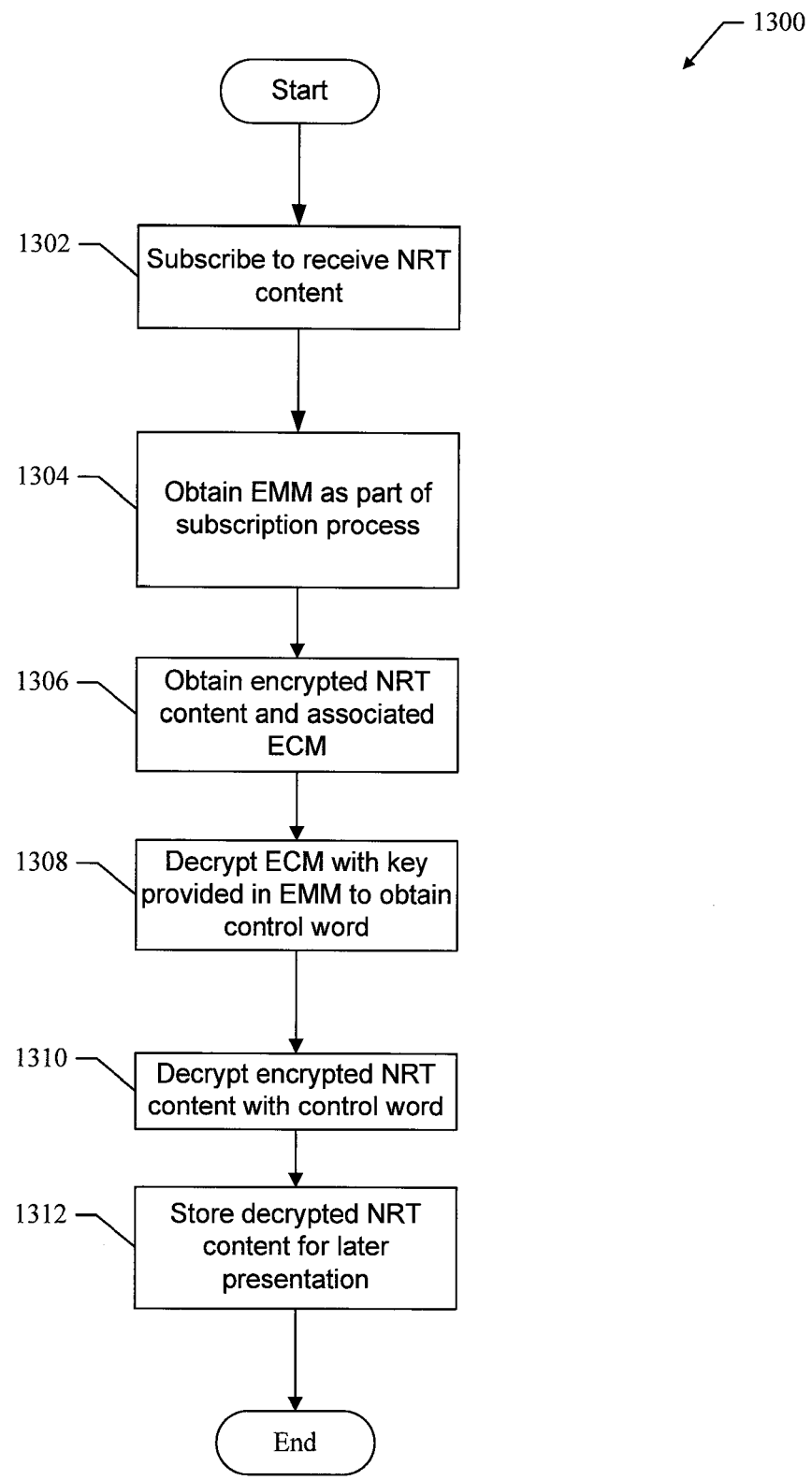
FIG. 13 shows an exemplary method for receiving NRT content for use in aspects of a NRT content distribution system.

FIG. 13 shows an exemplary method 1300 for use in aspects of a NRT content distribution system. For clarity, the method 1300 is described herein with reference to the NRT content receiving module 1200 shown in FIG. 12. For example, in an aspect, the processing logic 1202 executes one or more sets of codes to control the NRT content receiving module 1200 to perform the operations described below.

At block 1302, NRT content is subscribed for. In an aspect, the processing logic 1202 operates to subscribe to receive selected NRT content from one or more content vendors.

At block 1304, EMM(s) associated with the subscribed for NRT content are received. For example, as part of the subscription process, the processing logic 1202 obtains EMMs from the appropriate content vendors. In an aspect, the EMMs are obtained by the protocol stack interface 1210 and passed to the key acquisition logic 1204.

At block 1306, encrypted NRT content and associated ECM are obtained. In an aspect, the processing logic 1202 operates to control the protocol stack interface 1210 to obtain the encrypted NRT content and ECM(s).

At block 1308, the received ECM is passed to the key acquisition logic 1204 where the key provided in the EMM is used to decrypt the ECM to obtain a control word that was used to encrypt the encrypted NRT content.

At block 1310, the received encrypted NRT content is decrypted with the control word. In an aspect, the decryption logic 1208 operates to decrypt the encrypted NRT content using the control word.

At block 1312, the decrypted NRT content is passed to the rendering logic interface 1206 where it is rendered or stored for later presentation.

Thus, the method 1300 operates to provide an aspect of a NRT content distribution system. It should be noted that the method 1300 represents just one implementation and that other implementations are possible within the scope of the aspects.

Figure 14:
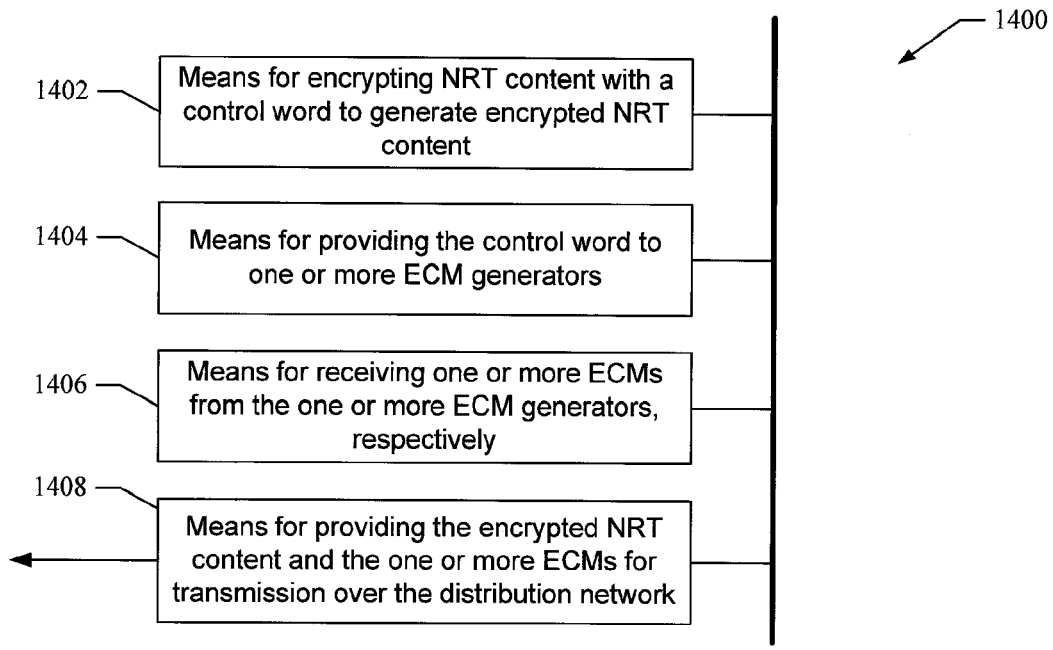
FIG. 14 shows an exemplary NRT content delivery component for use in aspects of a NRT content distribution system.

FIG. 14 shows a NRT content delivery module 1400 for use in aspects of a NRT content distribution system. For example, the NRT content delivery module 1400 is suitable for use as the NRT content delivery module 112 shown in FIG. 1. In an aspect, the NRT content delivery module 1400 is implemented by at least one processor comprising one or more modules configured to provide aspects of a NRT content distribution system as described herein. For example, each module comprises hardware and/or hardware executing software.

The NRT content delivery module 1400 comprises a first module comprising means (1402) for encrypting NRT content with a control word to generate encrypted NRT content, which in an aspect comprises file management module 504. The NRT content delivery module 1400 also comprises a second module comprising means (1404) for providing the control word to one or more entitlement control message (ECM) generators, which in an aspect comprises the SCS 506. The NRT content delivery module 1400 also comprises a third module comprising means (1406) for receiving one or more ECMs from the one or more ECM generators, respectively, wherein each ECM comprises a unique encryption of the control word to provide conditional access to the control word, which in an aspect comprises the SCS 506. The NRT content delivery module 1400 also comprises a fourth module comprising means (1408) for providing the encrypted NRT content and the one or more ECMs for transmission over a distribution network, which in an aspect comprises the file management module 504.

Figure 15:
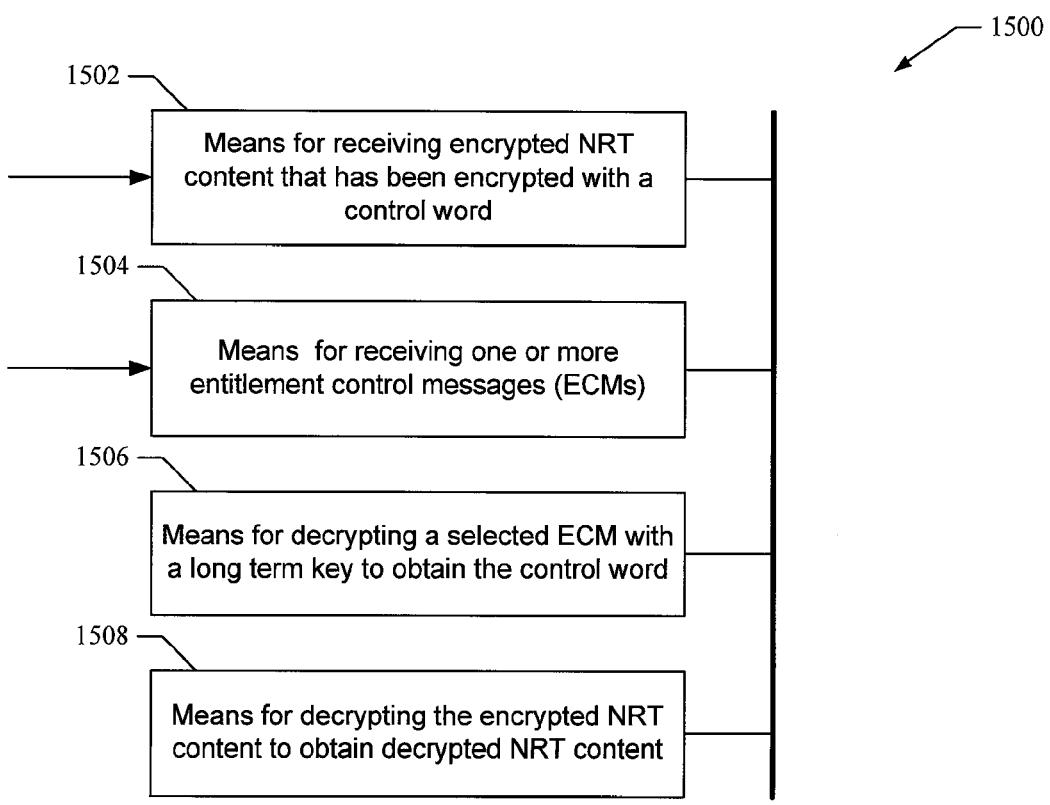
FIG. 15 shows an exemplary NRT content receiving module for use in aspects of a NRT content distribution system.

FIG. 15 shows a NRT content receiving module 1500 for use in aspects of a NRT content distribution system. For example, the NRT content receiving module 1500 is suitable for use as the NRT content receiving module 116 shown in FIG. 1. In an aspect, the NRT content receiving module 1500 is implemented by at least one processor comprising one or more modules configured to provide aspects of a NRT content distribution system as described herein. For example, each module comprises hardware, and/or hardware executing software.

The NRT content receiving module 1500 comprises a first module comprising means (1502) for receiving encrypted NRT content that has been encrypted with a control word, which in an aspect is comprises the processing logic 1202. The NRT content receiving module 1500 also comprises a second module comprising means (1504) for receiving one or more entitlement control messages (ECMs), which in an aspect comprises the processing logic 1202. The NRT content receiving module 1500 also comprises a third module comprising means (1506) for decrypting a selected ECM with a long term key to obtain the control word, which in an aspect comprises the key acquisition logic 1204. The NRT content receiving module 1500 also comprises a fourth module comprising means (1508) for decrypting the encrypted NRT content to obtain decrypted NRT content, which in an aspect comprises the decryption logic 1208.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a NRT content distribution system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A machine-implemented method for distributing non real-time (NRT) content over a distribution network, the method comprising:

encrypting, by a processor, the NRT content with a control word to generate encrypted NRT content;

providing the control word to one or more entitlement control message (ECM) generators, wherein the one or more ECM generators comprise a first ECM generator associated with a first conditional access system that encrypts the control word using a first long term key to generate a first ECM, and a second ECM generator associated with a second conditional access system, different than the first conditional access system, that encrypts the control word using a second long term key to generate a second ECM, wherein the first long term key and the second long term key are different;

receiving one or more ECMs from the one or more ECM generators, respectively, wherein each ECM comprises a unique encryption of the control word such that a user having access to the first long term key or the second long term key can decrypt the control word; and encapsulating the encrypted NRT content and the one or more ECMs into an encapsulated file for transmission over the distribution network, wherein a file format of the encapsulated file comprises a clip definition record that identifies the first conditional access system that generated the first ECM and the second conditional access system that generated the second ECM.

2. The machine-implemented method of claim 1, further comprising receiving the control word from a control word generator.

3. The machine-implemented method of claim 1, further comprising:

obtaining one or more access criteria (AC) parameters to be associated with the NRT content; and providing the one or more AC parameters to the one or more ECM generators, respectively.

4. The machine-implemented method of claim 1, wherein the file format of the encapsulated file further comprises the first ECM and the second ECM.

5. The machine-implemented method of claim 4, wherein the clip definition record further identifies the encrypted NRT content.

6. An apparatus comprising:

a processor configured to distribute non real-time (NRT) content over a distribution network, the processor comprising:

a synchronizer implemented at least partially in hardware and configured to provide a control word to a plurality of entitlement control message (ECM) generators, each of the plurality of ECM generators associated with a different conditional access system, each conditional access system encrypting the control word using a different long key generate one or more ECMs, and receive the one or more ECMs from each of the plurality of ECM generators, respectively, wherein each ECM comprises a unique encryption of the control word such that a user having access to any of the long term keys can decrypt the control word; and a management module configured to encrypt the NRT content with the control word to generate encrypted NRT content and provide the encrypted NRT content and the ECMs for transmission over the distribution network, wherein the management module is configured to encapsulate the encrypted NRT content and the ECMs into an encapsulated file, wherein a file format of the encapsulated file comprises a clip definition record that identifies the different conditional access systems associated with each of the plurality of ECM generators that generated the ECMs.

7. The apparatus of claim 6, wherein said synchronizer is configured to obtain the control word from a control word generator.

8. The apparatus of claim 6, wherein said synchronizer is configured to:

obtain one or more access criteria (AC) parameters to be associated with the NRT content; and provide the one or more AC parameters to the plurality of ECM generators, respectively.

9. The apparatus of claim 6, wherein the clip definition record identifies the encrypted NRT content and comprises the ECMs.

10. An apparatus configured to distribute non real-time (NRT) content over a distribution network, the apparatus comprising at least one processor, the at least one processor comprising one or more modules, the one or more modules comprising:
- means for encrypting the NRT content with a control word to generate encrypted NRT content;
- means for providing the control word to a plurality of entitlement control message (ECM) generators, wherein each of the plurality of ECM generators is associated with a different conditional access system, each conditional access system encrypting the control word using a different long term key to generate one or more ECMs;
- means for receiving one or more ECMs from the one or more ECM generators, respectively, wherein each ECM comprises a unique encryption of the control word such that a user having access to any of the long term keys can decrypt the control word;
- means for providing the encrypted NRT content and the ECMs for transmission over the distribution network; and
- means for encapsulating the encrypted NRT content and the ECMs into an encapsulated file, wherein the file format of the encapsulated file comprises a clip definition record that identifies the different conditional access systems associated with each of the plurality of ECM generators that generated the ECMs.

11. The apparatus of claim 10, further comprising means for receiving the control word from a control word generator.

12. The apparatus of claim 10, further comprising:
- means for obtaining one or more access criteria (AC) parameters to be associated with the NRT content; and
- means for providing the one or more AC parameters to the plurality of ECM generators, respectively.

13. The apparatus of claim 10, wherein the clip definition record identifies the encrypted NRT content and comprises the ECMs.

14. A non-transitory machine readable medium embodying instructions that, when executed by a processor, allow the processor to perform a method for distributing non real-time (NRT) content over a distribution network, the method comprising:
- providing a control word to one or more entitlement control message (ECM) generators, wherein the one or more ECM generators comprise a first ECM generator associated with a first conditional access system that encrypts the control word using a first long term key to generate a first ECM, and a second ECM generator associated with a second conditional access system, different than the first conditional access system, that encrypts the control word using a second long term key to generate a second ECM, wherein the first long term key and the second long term key are different;
- receiving one or more ECMs from the one or more ECM generators, respectively, wherein each ECM comprises a unique encryption of the control word such that a user having access to the first long term key or the second long term key can decrypt the control word;
- encrypting the NRT content with the control word to generate encrypted NRT content;
- encoding the encrypted NRT content and the one or more ECMs into an encapsulated file for transmission over the distribution network, wherein a file format of the encapsulated file comprises a clip definition record that identifies the first conditional access system that generated the first ECM and the second conditional access system that generated the second ECM; and
- providing the encapsulated file for transmission over the distribution network.

15. A server configured to distribute non real-time (NRT) content over a distribution network, the server comprising:
- a network interface; and
- a processor, the processor configured to communicate with the network interface, the processor comprising:
  - a synchronizer implemented at least partially in hardware and configured to provide a control word to a plurality of entitlement control message (ECM) generators, each of the plurality of ECM generators associated with a conditional access system, each conditional access system encrypting the control word using a different long term key to generate one or more ECMs, and receive the one or more ECMs from each of the plurality of ECM generators, respectively, wherein each ECM comprises a unique encryption of the control word such that a user having access to any of the long term keys can decrypt the control word to provide separate conditional access to the control word by each of the conditional access systems; and
  - a management module configured to encrypt the NRT content with the control word to generate encrypted NRT content and provide the encrypted NRT content and the one or more ECMs over the network interface for transmission over the distribution network, wherein the management module is configured to encapsulate the encrypted NRT content and the ECMs into an encapsulated file, wherein a file format of the encapsulated file comprises a clip definition record that identifies the conditional access systems associated with each of the plurality of ECM generators that generated the ECMs.

16. A machine-implemented method for receiving non real-time (NRT) content over a distribution network, the method comprising:
- receiving encrypted NRT content that has been encrypted with a control word and one or more entitlement control messages (ECMs) in an encapsulated file, wherein the one or more ECMs comprises a first ECM having the control word encrypted using a first long term key by a first conditional access system, and a second ECM having the control word encrypted using a second long term key by a second conditional access system different than the first conditional access system, wherein the first long term key is different from the second long term key, wherein a file format of the encapsulated file comprises a clip definition record that identifies the first conditional access system that generated the first ECM and the second conditional access system that generated the second ECM;
- decrypting, by a processor, a selected ECM using the first long term key or the second long term key to obtain the control word; and
- decrypting the encrypted NRT content to obtain decrypted NRT content.

17. The machine-implemented method of claim 16, further comprising receiving an entitlement management message (EMM) that comprises the first long term key or the second long term key.

18. The machine-implemented method of claim 16, wherein the file format of the encapsulated file further comprises the first ECM and the second ECM.

19. The machine-implemented method of claim 18, wherein the clip definition record further identifies the encrypted NRT content.

20. An apparatus comprising:
a processor for receiving non real-time (NRT) content over a distribution network, the processor comprising:
processing logic implemented at least partially in hardware and configured to receive encrypted NRT content that has been encrypted with a control word and receive a plurality of entitlement control messages (ECMs), each of the plurality of ECMs having the control word encrypted using a different long term key by a different conditional access system, wherein the processing logic is configured to receive the encrypted NRT content and the plurality of ECMs in an encapsulated file, wherein a file format of the encapsulated file comprises a clip definition record that identifies the different conditional access systems associated with each of the plurality of ECMs;
key acquisition logic configured to decrypt a selected ECM of the plurality of ECMs using one of the different long term keys to obtain the control word; and
decryption logic configured to decrypt the encrypted NRT content to obtain decrypted NRT content.

21. The apparatus of claim 20, wherein said processing logic is configured to receive an entitlement management message (EMM) that comprises one of the different long term keys.

22. The apparatus of claim 20, wherein the clip definition record identifies the encrypted NRT content and comprises the plurality of ECMs.

23. An apparatus for receiving non real-time (NRT) content over a distribution network, the apparatus comprising at least one a processor, the at least one processor comprising one or more modules, the one or more modules comprising:
means for receiving encrypted NRT content that has been encrypted with a control word and one or more entitlement control messages (ECMs) in an encapsulated file, wherein the one or more ECMs comprises a first ECM having the control word encrypted using a first long term key by a first conditional access system, and a second ECM having the control word encrypted using a first long term key by a second conditional access system different than the first conditional access system, wherein the first long term key and the second long term key are different, wherein a file format of the encapsulated file comprises a clip definition record that identifies the first conditional access system associated with the first ECM, and the second conditional access system associated with the second ECM;
means for decrypting a selected ECM using the first long term key or the second long term key to obtain the control word;
and
means for decrypting the encrypted NRT content to obtain decrypted NRT content.

24. The apparatus of claim 23, further comprising means for receiving an entitlement management message (EMM) that comprises the long term key.

25. The apparatus of claim 23, wherein the file format of the encapsulated file further comprises the first ECM and the second ECM.

26. The apparatus of claim 25, wherein the clip definition record further identifies the encrypted NRT content.

27. A non-transitory machine readable medium embodying instructions that, when executed by a processor, allow the processor to perform a method for receiving non real-time (NRT) content over a distribution network, the method comprising:
receiving encrypted NRT content that has been encrypted with a control word;
receiving a plurality of entitlement control messages (ECMs), wherein each of the plurality of ECMs has the control word encrypted using a different long term key by a different conditional access system, wherein the encrypted NRT content and the plurality of ECMs are received in an encapsulated file, wherein a file format of the encapsulated file comprises a clip definition record that identifies the different conditional access systems associated with each of the plurality of ECMs;
decrypting a selected ECM of the plurality of ECMs with one of the different long term keys to obtain the control word; and
decrypting the encrypted NRT content to obtain decrypted NRT content.

28. A device configured to distribute non real-time (NRT) content over a distribution network, the device comprising:
an antenna;
processing logic configured to receive, using the antenna, encrypted NRT content that has been encrypted with a control word and one or more entitlement control messages (ECMs) in an encapsulated file, wherein the one or more ECMs comprises a first ECM having the control word encrypted using a first long term key by a first conditional access system, and a second ECM having the control word encrypted using a second long term key by a second conditional access system different than the first conditional access system, wherein the first long term key and the second long term key are different, wherein a file format of the encapsulated file comprises a clip definition record that identifies the first conditional access system associated with the first ECM, and the second conditional access system associated with the second ECM;
key acquisition logic configured to decrypt a selected ECM using the first long term key or the second long term key to obtain the control word; and
decryption logic configured to decrypt the encrypted NRT content to obtain decrypted NRT content.

29. A machine-implemented method for distributing non real-time (NRT) content over a distribution network, the method comprising:
encrypting, by a processor, the NRT content with a control word to generate encrypted NRT content;
providing the control word to one or more entitlement control message (ECM) generators to generate a first ECM encrypted with a first long term key and a second ECM encrypted with a second long term key, wherein the first long term key and the second long term key are different;
receiving one or more ECMs from the one or more ECM generators, respectively, wherein each ECM comprises a unique encryption of the control word such that a user having access to the first long term key or the second long term key can decrypt the control word to provide conditional access to the control word; and
encapsulating the encrypted NRT content and the one or more ECMs into an encapsulated file for transmission over the distribution network.

30. The machine-implemented method of claim 29, further comprising receiving the control word from a control word generator.

31. The machine-implemented method of claim 29, further comprising:
obtaining one or more access criteria (AC) parameters to be associated with the NRT content; and providing the one or more AC parameters to the one or more ECM generators, respectively.

32. The machine-implemented method of claim 29, wherein the file format of the encapsulated file further comprises the first ECM and the second ECM.

33. The machine-implemented method of claim 32, wherein the clip definition record further identifies the encrypted NRT content.

34. A non-transitory machine readable medium embodying instructions that, when executed by a processor, allow the processor to perform a method for distributing non real-time (NRT) content over a distribution network, the method comprising:
- providing a control word to one or more entitlement control message (ECM) generators to generate a first ECM encrypted with a first long term key and a second ECM encrypted with a second long term key, wherein the first long term key and the second long term key are different;
- receiving one or more ECMs from the one or more ECM generators, respectively, wherein each ECM comprises a unique encryption of the control word such that a user having access to the first long term key or the second long term key can decrypt the control word to provide conditional access to the control word;
- encrypting the NRT content with the control word to generate encrypted NRT content;
- encoding the encrypted NRT content and the one or more ECMs into a an encapsulated file for transmission over the distribution network, and
- providing the encapsulated file for transmission over the distribution network.

35. A machine-implemented method for receiving non real-time (NRT) content over a distribution network, the method comprising:
- receiving encrypted NRT content that has been encrypted with a control word and one or more entitlement control messages (ECMs) in an encapsulated file, wherein the one or more ECMs generates a first ECM encrypted with a first long term key and a second ECM encrypted with a second long term key, wherein the first long term key is different from the second long term key;
- decrypting, by a processor, a selected ECM with a using the first long term key or the second long term key to obtain the control word; and
- decrypting the encrypted NRT content to obtain decrypted NRT content.

36. The machine-implemented method of claim 32, further comprising receiving an entitlement management message (EMM) that comprises the first long term key or the second long term key.

37. The machine-implemented method of claim 35, wherein the clip definition record further identifies the encrypted NRT content.

38. An apparatus for receiving non real-time (NRT) content over a distribution network, the apparatus comprising at least one a processor, the at least one processor comprising one or more modules, the one or more modules comprising:
- means for receiving encrypted NRT content that has been encrypted with a control word and one or more entitlement control messages (ECMs) in an encapsulated file, wherein the one or more ECMs generates a first ECM encrypted with a first long term key and a second ECM encrypted with a second long term key, wherein the first long term key and the second long term key are different;
- means for decrypting a selected ECM with a using the first long term key or the second long term key to obtain the control word; and
- means for decrypting the encrypted NRT content to obtain decrypted NRT content.

39. The apparatus of claim 38, further comprising means for receiving an entitlement management message (EMM) that comprises the long term key.

40. The apparatus of claim 38, wherein the clip definition record further identifies the encrypted NRT content.

41. A device configured to distribute non real-time (NRT) content over a distribution network, the device comprising:
- an antenna;
- processing logic configured to receive, using the antenna, encrypted NRT content that has been encrypted with a control word and one or more entitlement control messages (ECMs) in an encapsulated file, wherein the one or more ECMs generates a first ECM encrypted with a first long term key and a second ECM encrypted with a second long term key, wherein the first long term key and the second long term key are different;
- key acquisition logic configured to decrypt a selected ECM with a using the first long term key or the second long term key to obtain the control word; and
- decryption logic configured to decrypt the encrypted NRT content to obtain decrypted NRT content.

* * * * *